(12) United States Patent
Li

(10) Patent No.: US 6,907,087 B1
(45) Date of Patent: Jun. 14, 2005

(54) METHOD OF MULTI SELECTION COHERENT DETECTION AND DEVICE THEREOF

(75) Inventor: Huajia Li, Shanghai (CN)

(73) Assignee: Huwei Technologies Co., Ltd., Shenzhen (CN)

(*) Notice: Subject to any disclaimer, the term of this patent is extended or adjusted under 35 U.S.C. 154(b) by 584 days.

(21) Appl. No.: 09/830,385

(22) PCT Filed: Jun. 12, 2000

(86) PCT No.: PCT/CN00/00151
§ 371 (c)(1),
(2), (4) Date: Aug. 2, 2001

(87) PCT Pub. No.: WO01/39530
PCT Pub. Date: May 31, 2001

(30) Foreign Application Priority Data

Nov. 25, 1999 (CN) ........................................ 99124113 A

(51) Int. Cl.[7] ............................. H04L 27/22; H04B 1/69
(52) U.S. Cl. .......................... 375/316; 375/148; 375/150
(58) Field of Search ................................. 375/316, 325, 375/328–332, 340, 342, 368; 329/300, 302; 370/209, 514

(56) References Cited

U.S. PATENT DOCUMENTS

| | | | | |
|---|---|---|---|---|
| 5,017,883 A | * | 5/1991 | Divsalar et al. ............ 329/304 |
| 5,440,265 A | * | 8/1995 | Cochran et al. ............ 329/300 |
| 5,673,286 A | * | 9/1997 | Lomp ......................... 375/148 |
| 5,691,974 A | * | 11/1997 | Zehavi et al. ............... 370/203 |
| 5,764,687 A | * | 6/1998 | Easton ........................ 375/147 |
| 5,818,868 A | * | 10/1998 | Gaudenzi et al. ........... 375/152 |
| 5,910,950 A | | 6/1999 | ten Brink |
| 6,240,099 B1 | * | 5/2001 | Lim et al. ................... 370/441 |

FOREIGN PATENT DOCUMENTS

CN  1126013  6/1996

* cited by examiner

Primary Examiner—Amanda T. Le
Assistant Examiner—Lawrence B. Williams
(74) Attorney, Agent, or Firm—Merchant & Gould P.C.

(57) ABSTRACT

A method and device used in wireless mobile communication for multi-selection signal detection. In order to minimize the influence of frequency shift and phase rotation that reduces signal detection performance, the total number of samples used for the signal detection may be divided into an equal number of segments, on which the coherent accumulating sum is calculated. Various possible combinations will be made according to each coherent result. The combinations may then be coherent accumulated again. Finally, the optimum results may be selected as the detection results. To accomplish this result, the input signal is input to the matched filter unit, whose output will be sent to each branch unit. The phase adjustment and the coherent accumulation of the signal will be performed in each respective branch unit, and then sent to the branch selection unit where the branch output with the largest mode is selected as the output.

8 Claims, 2 Drawing Sheets

METHOD OF MULTI SELECTION COHERENT DETECTION AND DEVICE THEREOF

CROSS REFERENCE TO RELATED APPLICATIONS

This application is a 35 U.S.C. 371 of PCT application PCT/CN00/00151 filed Jun. 12, 2000, which claims priority on application 99124113.4 filed on Nov. 24, 1999 in China.

FIELD OF THE INVENTION

The present invention relates to a signal detection of the wireless mobile communication. More particularly, it relates to a method and its device for a multi-selection coherent detection.

BACKGROUND OF THE INVENTION

It is well known that the received signal may be affected by the so-called Doppler effect in the wireless mobile communication, and a Doppler frequency shift may be produced with respect to the transmittal signal. The size and the feature of the frequency shift may be determined by the relative motion between the transmitter and the receiver, and the environment of the signal transmission. However, phase rotation, even the phase reversion, may occur on the received wireless communication transmitting signal. Therefore, the influence of those factors should be fully considered while detecting the signal. Otherwise, the performance of the signal detection will inevitably be affected.

If the complex discrete signal transmitted is assumed as $X(k)$ ($k=0 \ldots L-1$), then the received discrete signal after sampling will be:

$$Y(k) = a(k)*X(k)*e^{j\phi(k)} + n(k), (k=0 \ldots L-1) \quad (1)$$

wherein, $a(k)$ is an attenuation factor after passing through the channel, $\phi(k)$ is a phase rotation angle after the signal passing through the channel, $n(k)$ is an additive noise, and $k$ represents the indices of the discrete signal, under the condition of transmitting the data and sampling the signal at a constant rate. It can also be considered as a representation of the indices of the time. The total number of the signal samples for performing the signal detection is $L$.

Several typical signal detection methods of the related art are shown as below:

1. Coherent signal detection method, in which, the signal will be coherent accumulated directly in a range with a length of L. That is, the transmitted signal and the received signal will be multiplied by conjugation, and the multiplied result will be accumulated in the range with the length L. Then the summing result obtained finally is calculated for the square of the mode, which is used as a decision statistic of the coherent detection. The decision statistic is represented by the following equation:

$$Z_{coherent} = \left| \sum_{k=0}^{L-1} Y(k) * X^*(k) \right|^2 \quad (2)$$

The equation 2 will be substituted by the equation 1 of the received signal, obtaining:

$$Z_{coherent} = \left| \sum_{k=0}^{L-1} [a(k)*X(k)*X^*(k)*q^{j\phi(k)}] + n \right|^2 \quad (3)$$

Where, $$n = \sum_{k=0}^{L-1} X^*(k)*n(k), X*(k)$$

is a complex conjugate signal of $X(k)$.

A good detection result can only be obtained by using such detection method when the phase of the received signal varies not so significant within the length L. It is difficult to achieve a phase of the received signal that does not vary significantly within the length L, under certain communication environments.

2. Non-coherent detection method: The fundamental idea of this detection method is to divide the signal of L samples used to detect the signal into the segments with equal space $N_{noncoh}$ ($N_{noncoh}>1$). The length of each segment is $L/N_{noncoh}=S_{noncoh}$. The coherent accumulating sum $T(m)$ will be calculated for each length of $S_{noncoh}$, that is:

$$T(m) = \sum_{k=0}^{S_{noncoh}-1} [Y(m*S_{noncoh}+k) * X*(m*S_{noncoh}+k)], \quad (4)$$

$$m = 0 \ldots N_{noncoh}-1$$

The coherent result of each segment is $T(m)$, and there are $N_{noncoh}$ total data, then the non-coherent accumulating will be performed again. The equation for calculating the decision statistic will be obtain as follows:

$$Z(k) = \sum_{m=0}^{N_{noncoh}-1} |T(m)|^2 \quad (5)$$

Substitute the equation 1 and 4 into 5, then obtain:

$$Z(k) = \sum_{m=0}^{N_{noncoh}-1} \left| \sum_{k=0}^{S_{noncoh}-1} [a(m*S_{noncoh}+k)*X(m*S_{noncoh}+k)*^2 \right. \quad (6)$$

$$\left. X*(m*S_{noncoh}+k)*e^{j\phi(m*S_{noncoh}+k)}] + n_m(m) \right|^2$$

Where, $$n_m(m) = \sum_{k=0}^{S_{noncoh}-1} [X^*(m*S_{noncoh}+k)*n(m*S_{noncoh}+k)].$$

To achieve better performance by this detection method, it is required that the phase of the received signal remain constant within the signal length of $S_{noncoh}$. However, even when the phase of the received signal may be maintained constant within L ($l>S_{noncoh}$), then the detection performance loss of the non-coherent detection method will be smaller than the gain obtained from suppressing the phase rotation. In general, it is worse than the coherent detection method of Method 1.

3. Differential detection method: The fundamental idea of this method is also to divide L samples into segments with equal spaces $N_{diff}$ ($N_{diff}>1$), where the length of each segment is $L/N_{diff}=S_{diff}$, by using the coherent accumulating method for each length of $S_{diff}$. $N_{diff}$ coherent accumulating values will be obtained:

$$Q(m) = \sum_{k=0}^{S_{diff}-1} [Y(m*S_{diff}+k)*X*(m*S_{diff}+k)] \quad m=0 \ldots N_{diff}-1 \quad (7)$$

The coherent result Q(m) of two consecutive segments will be conjugately multiplied by each other, resulting in total of $N_{diff}-1$ multiplications, then adding the real part of $N_{diff}-1$ multiplications, and obtaining the following equation for calculating the decision statistic:

$$Z = \sum_{m=0}^{N_{diff}-2} \text{Re}\{Q(m)*Q*(m+1)\} \quad (8)$$

Substitute the equation 1 and 7 into 8, and expend it to obtain:

$$z = \sum_{m=0}^{N_{diff}-2} \text{Re}\left\{ \left( \sum_{k=0}^{S_{diff}-1} \left[ a(m*S_{diff}+k)*X(m*S_{diff}+k)* \right. \right. \right.$$
$$\left. \left. X*(m*S_{diff}+k)*e^{j\phi(m*S_{diff}^{+k})} \right] + n_m m \right) *$$
$$\left( \sum_{k=0}^{S_{diff}-1} \left[ a((m+1)*S_{diff}+k)*X((m+1)*S_{diff}+k)*X* \right. \right.$$
$$\left. \left. \left. ((m+1)*S_{diff}+k)*e^{j\phi((m+1)*S_{diff}^{+k})} \right] + n_m^*(m+1) \right) \right\} \quad (9)$$

Where, $$n_m(m) = \sum_{k=0}^{S_{diff}-1} [n(m*S_{diff}+k)*X*(m*S_{diff}+k)]$$

Same as method 2, the application condition of the differential detection method can be satisfied only if the phase of the received signal maintains substantially constant within $S_{diff}$. Nevertheless this method has similar application conditions as Method 1 (the phase of the received signal maintains substantially constant within the length L). The detection performance loss of the differential detection method itself is also smaller than the gain obtained from suppressing the phase rotation. In general, it is worse than the detection performance of the coherent detection method of Method 1.

4. Combination detection method: This method of the combination of the above three methods. The range of Doppler frequency shift may be detected (or specified) by certain methods. In the case of high Doppler frequency shift, the non-coherent or differential detection method may be used; while in the case of low Doppler frequency shift, the coherent detection method can be used. The implementation of this method is rather difficult, and the optimum detection performance can not be obtained yet.

By comparing in general:

Method 1 is established on the basis of assuming that the phase of the signal maintains substantially constant within a range of the length L, in the case of low frequency shift (including Doppler frequency shift and system frequency shift, the same below). This condition can be satisfied substantially (according to the chip rate and the signal length L, the same below), and an excellent detection effect can be reached; but in the case of large frequency shift, this assumption may not be established. Within the length L, the signal phase may be change greatly even the phase reverse may occur. This may cause the coherent results to cancel each other out. Thereby, the detection performance decreases rapidly, even non signal can be detected.

The application condition of Method 2 will relax to: keeping the signal phase within the length $S_{noncoh}$ ($S_{noncoh}<L$), substantially constant, so that in the case of a higher frequency shift, the signal phase may not be changed greatly when it is within $S_{noncoh}$ (it should be noted, that $S_{noncoh}=L/N_{noncoh}<L$), and the performance degradation appearing in Method 1 will no longer occur. In this situation, the performance will be better than that of Method 1. However, in the case of a low frequency shift, Method 1 also has the condition of maintaining the signal phase as a constant within the coherent length L. At this time, comparing the non-coherent of Method 2 with Method 1, a certain performance loss may exist.

Method 3 is as same as that analyzed in Method 2, in the case of higher frequency shift, though the differential detection method can obtain a better detection performance than that of Method 1. However, in the case of low frequency shift, the performance loss will be larger than that of Method 1.

Although a better performance can be achieved by using Method 4 in the case of a variety of Doppler frequency shift, it is complicated by using the method of the protocol limitation. By using the detection method, the Doppler frequency shift estimate module is required, so that, it is difficult to ensure accuracy.

SUMMARY OF THE INVENTION

The object of the present invention addressed the problems existing in several detection methods listed above, and provides a method and a device for multi-selection coherent detection, in order to reduce the influence of the phase rotation caused by the frequency shift, and to improve the signal detection probability.

In order to realize the above object, the multi selection coherent detection method of the present invention is proposed, comprising the steps of:

A. The length L used for the signal detection may be divided into $N_{multicoh}$ segments, the coherent accumulating will be performed within each segment. Total $N_{multicoh}$ coherent results can be obtained. They will be denoted as $X_i$ (i-0) ... $N_{noncoh}-1$).

B. Various possible phase adjustments can be performed on those $N_{multicoh}$ coherent results. (The number of the possible phase adjustments will be denoted as P.) The adjustment results will be denoted as $Y_{i,j}$ (i=0 ... $N_{multicoh}-1$, j=0 ... P-1).

C. A value of the adjustment result will be selected among P adjustment results corresponding to each coherent result and will be combined with each other in various possible ways. The largest number of the combination will be $C=P^{N_{multicoh}}$.

D. $N_{multicoh}$ adjustment results in each combination will be coherent accumulated, and $C=P^{N_{multicoh}}$ coherent results can be obtained. They will be denoted as $Z_t$ (t=0 ... C−1).

E. Among $C=P^{N_{multicoh}}$ coherent results, the optimum ones are selected as the detection results.

The multi-selection coherent detection device according to the present invention consists of:

a matched filter unit; two or more branch units; and a branch selection unit. The input signal will be input to the matched filter unit. The output of the matched filter unit will be sent to each branch unit respectively. The phase adjustment and the coherent accumulation of the signal will be performed in each branch unit respectively, and then sent to the branch selection unit. The branch with largest mode is selected to output by the branch selection unit.

DETAILED DESCRIPTION OF THE PREFERRED EMBODIMENTS

Figure 1:
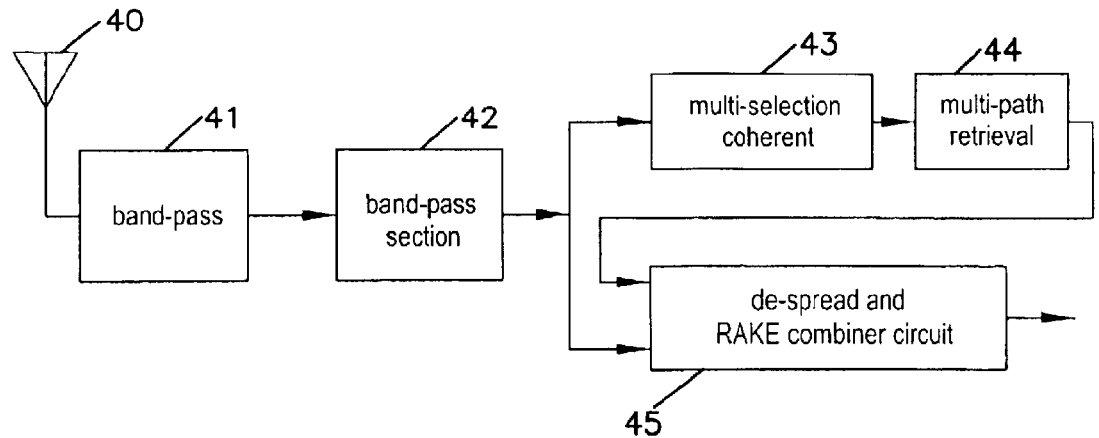
FIG. 1 is a principle block diagram of a reverse access receiver system of the wide-band code division multiple access (WCDMA) according to the method of the present invention.

The coherent detection method according to the present invention comprises following steps: the length L used for the signal detection is divided into $N_{multicoh}$ segments of multi coherent segments, the coherent accumulating will be performed within each segment, then total $N_{multicoh}$ coherent results can be obtained, they will be denoted as $X_i$ ($i=0 \ldots N_{noncoh}-1$); assuming that the signal is divided into segments with equal spaces, then the length of each segment will be $S_{multicoh}=L/N_{multicoh}$:

$$X_m = \sum_{k=0}^{S_{multicoh}-1} (Y(m*S_{multicoh}+k)*X*(m*S_{multicoh}+k)), \quad (10)$$

$$m = 0 \ldots N_{multicoh} - 1$$

And then, various possible phase adjustments may be performed on those $N_{multicoh}$ coherent results respectively. (The number of the possible phase adjustment will be denoted as P.) The adjustment results will be denoted as $Y_{i,j}$ ($i=0 \ldots N_{multicoh}-1$, $j=0 \ldots P-1$). A value of the adjustment result will be selected from the adjustment results on which to perform various possible combinations. Then those possible combinations will be coherent accumulated again. After coherent accumulating, $C=P^{N multicoh}$ coherent results can be obtained, and will be denoted as $Z_t$ ($t=0 \ldots C-1$).

$$Z_t = \sum_{k=0}^{N_{multicoh}-1} [Xx*e^{j\phi t,m}], t = 0 \ldots C-1 \quad (11)$$

Among $C=P^{N multicoh}$ coherent results, the optimum ones are selected as the detection results. The method of the present invention follows the decision formula below:

$$Z=OPT\{Z_t\}, t=0 \ldots C-1 \quad (12)$$

Where, OPT { } is a selected optimum operator, which means that the optimum value is selected from a series of values.

In general, the above segment dividing method is used for the segments with equal spaces, but it could be the segments with unequal spaces, according to the particular situation.

In the phase adjustment of step B, when the number of the phase adjustment is P, a phase rotation of $\phi=\phi 0+k*2\pi/p$, ($k=0 \ldots P-1$), will be performed on the signals respectively, wherein, $\phi 0$ can be any value. The relation between the phase rotation $\phi$ and p is not limited by this expression.

In step A, a coherent result $X_i$ will be obtained for each segment, and the total number is $N_{multicoh}$, and P phase adjustment will be performed on each coherent result according to step B.

An adjustment coherent result will be selected from P adjustment coherent results corresponding to each above coherent result, then total $N_{multicoh}$ adjustment coherent results will be coherent added, and a final coherent result $Z_t$ will be obtained. In this way, there are total $C=P^{N multicoh}$ selections, and again, $C=P^{N multicoh}$ final coherent results $Z_t$ can be obtained.

In step C, the method of the larges mode may be used as a criterion of selecting the optimum ones.

The number of the said maximum coherent results is $C=P^{N multicoh}$, but it does not signify that $C=P^{N multicoh}$ coherent results must be obtained in the practical application. According to the situation, the method in which the number of the coherent results is less than $C=P^{N multicoh}$ may be used to reduce the number of the coherent results required.

Next, the prefix detection of the reverse access channel of the wide-band code division multiple access (WCDMA) used as an implementation of the method of the present invention will be described. The length of the prefix chip is 4096 chips, at the chip rate of 3.84 Mbp/s, and the carrier frequency of 2 GHz, and under the speed of 500 Km/h which is the requirement of the WCDMA protocol standard. Signal phase reverse may occur in a range of 4096 chips. If the above Method 1 is used under this condition, then the rapid degrading of the performance will be occurred inevitably (see curve 1 of FIG. 3).

Referring to FIG. 1, a system shown in FIG. 1 is the practical application of the method of the present invention. IN the said system, the received signal reaches the band-pass filter 41, according to the wide-band code division multiple access (WCDMA) frequency band via an antenna 40, and a band limited signal will be obtained, and then reaches the bae-band section 42. The conversion of the radio frequency signal to base-band signal, as well as the function of the digital to analog conversion will be performed in the base-band section 42, and a base-band signal can be obtained.

Alternatively, the base-band signal is sent to the multi-selection coherent circuit 43, and a multi-selection coherent signal will be obtained. The multi-selection coherent signal is sent to the multi-path retrieval circuit 44 to perform multi-path retrieval. The obtained multi-path information will be sent to the de-spread and RAKE combiner circuit 45 as a signal of its first input port.

On the other hand, the base-band signal will be sent directly to de-spread and RAKE combiner circuit 45 as a signal of its second input port. The base-band signal will carry out de-spreading and RAKE combining by the de-spread and RAKE combiner circuit 45 on the basis of the multi-path information sent from the multi-path retrieval circuit 44. The result will be output after combining.

Take $N_{multicoh}=4$, P=2, then there are $2^4/2=8$ kinds of the possible coherent results (because the largest mode method is utilized finally, so it is not necessary to carry out the phase adjustment for the data of the first segment, thereby, the number of the possible coherent results required can be reduced to one half). $S_{multicoh}$=4096/4–1024 chips, also, P=2 kinds of the phases are taken as 0° and 180°, then the corresponding phase adjustment can be indeed by multiplying by 1 or –1.

According to the above method of the present invention, the multi-selection coherent detection device comprises a matched filter unit; two or more branch units; and a branch selection unit. The input signal will be input to the matched filer unit for carrying out matched and filtering. The output of the matched filer unit will be sent to each branch unit respectively. The phase adjustment and the coherent accumulation of the signal will be performed in each branch unit, and then sent to the branch selection unit; the branch output with the largest mode is selected to output by the branch selection unit.

Each said branch unit further comprises: a multiplier, for carrying out the phase adjustment; and adder, for carrying out the coherent accumulation; a holder, for holding the data; and a delay unit, for delaying the data. The output of the matched filter will be sent to the branch selection unit via the multiplier, and the adder in turn. Meanwhile, the adjustment series will be sent to the multiplier via the bolder, and the output of the adder will be fed back to its input via the delay unit.

Figure 2:
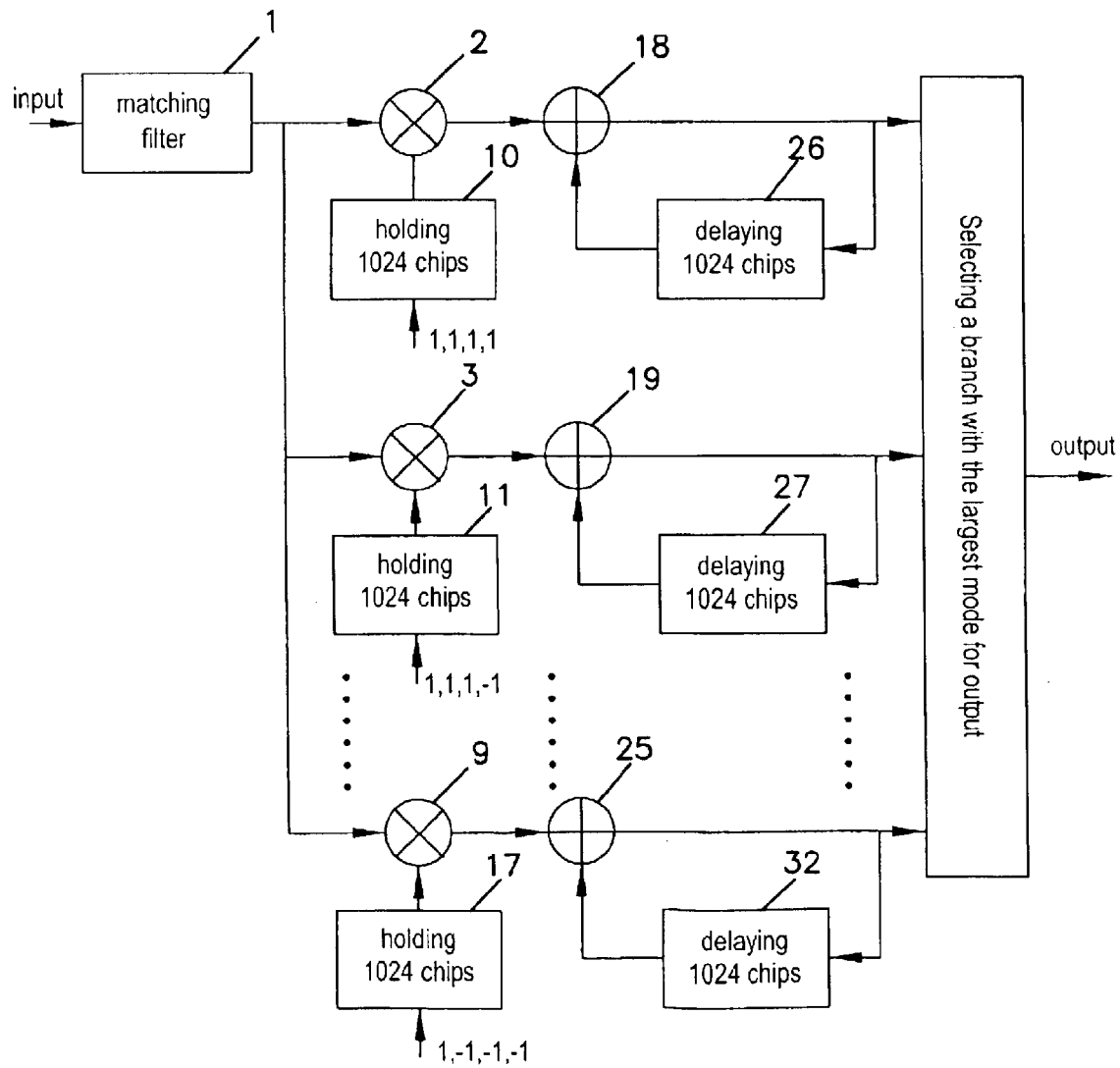
FIG. 2 is an illustration construction view showing a reverse access prefix multi-selection coherent detection device of the wide-band code division multiple access (WCDMA).

The operating principle and the operating process of the said device will be described in detail as follows:

As shown in FIG. 2., after the input signal being output through the matched filter, it is divided into eight branches, and sent to the multiplier 2~9 respectively as the signals of their first input ports. The construction of eight branch units is identical, except that the input signal of the holders 10~17 are different. Take branch unit 1 as an example, wherein a multiplier 2, a holder 10, and adder 18, and a delay unit 26 are included. The adjustment series of four bits 1, 1, 1, 1 will be inputted to the holder 10, and the information bits of each adjustment series will be held by the holder for a time period of 1024 chips, that is, the information of the first bit of the adjustment series may be outputted in the first 1024 chips time period. Then the information of the second bit of the adjustment series may be output in the second 1024 chips time period. The information of the third bit of the adjustment series may be outputted in the third 1024 chips time period. The information of the fourth bit of the adjustment series may be outputted in the fourth 1024 chips time period. The output of the holder 10 may be used as a signal for the second input port of the multiplier 2. In this way, 0° or 180° phase adjustment of the output signal of the matched filter 1 can be performed in the multiplier 2, and the signal after the phase adjustment will be sent to the adder 18 as a signal for its first input port. Another input port of the adder 18 may be connected with the delay unit 26. The first input port and the second input port are added by the adder, then it will be outputted to the selector 33 and the delay unit 26. The signal sent from the adder 18 is delayed in the delay unit for a time period of 1024 chips, and it will be feedback to the second input port of the adder 18. The adjustment series inputted to the holder 11 are 1, 1, 1, –1, and that inputted to the holder 12 are 1, 1, –1, 1, and that inputted to the holder 13 are 1, 1, –1, –1. According to this rule, that inputted to the holder 17 are 1, –1, –1, –1. There are total eight holders and eight different input adjustment series.

The sum results of the adders 26~32 will be sent to the selector 33 respectively as the signals for its first to eighth input ports. The largest mode $Max_n s$ (n=1, 2 ... 8) will be calculated by the selector 33 for the input of each branch at the fourth segment of 1024 chips. By comparing these largest mode $Max_n s$, a maximum value Max can be obtained. The coherent result of the branch (denoted as 1) corresponding to the maximum value Max will be outputted as the final output of resulting detection.

Figure 3:
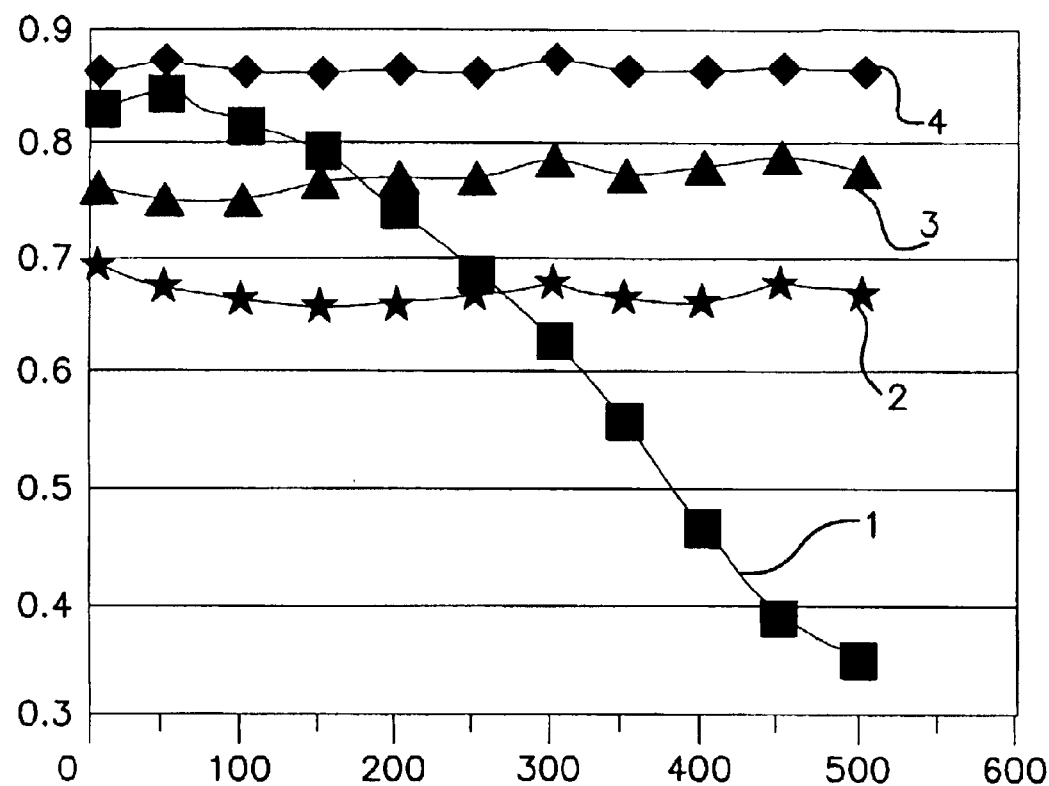
FIG. 3 is a diagram showing the comparison of the performance with respect to a reverse accessing prefix detection method of the wide-band code division multiple access (WCDMA).

Simulating tests of four detection methods, such as the coherent detection, non-coherent detection, differential detection and the multi-selection coherent detection of the present invention, have been carried out in the speed range of 5 km/h to 500 km/h, the simulating conditions are:

Constant False Alarm Rate (CFAR): 0.001
System frequency shift: 0 Hz
Channel type: Vehicle channel
ASNR: 5 dB The results of the simulating tests are shown in FIG. 3, in which, the horizontal axis indicates the moving speed (km/hour), and the vertical axis indicates the detection probability. The curve of the differential detection is labeled as 2, and the curve of the non-coherent detection is labeled as 3. Obviously, the signal detection performance of the multi-selection coherent detection method (see curve marked 4) of the present invention is superior to that of the other three signal detection algorithms.

APPLICABIITY OF THE INDUSTRY

The length L used by the signal detection according to the present invention is divided into $N_{multicoh}$ segments, the coherent accumulating is carried out within each segment, then the phase adjustment will be performed for those $N_{multicoh}$ coherent results, and a value will be selected from the adjustment results corresponding to each coherent result for carrying out various possible combinations; then these possible combinations will be accumulated coherently again. Finally, the optimum ones will be selected as the detection results. And a coherent detection device is used according to the above method. The device comprises a matched filter unit; two or more branch units; and a branch selection unit. The input signal will be inputted to the matched filter unit. The output of the matched filter unit will be sent to each branch unit respectively. It will be outputted after the branch circuit where the largest mode is selected by the branch selection unit.

The disadvantages, which exist in the above four methods, of the poor detection preformance caused by the system frequency shift and phase rotation are overcome by the method and the device of the present invention. The influence of the frequency shift and the phase rotation that reduces the signal detection performance can be suppressed by the said method and the device to a certain extent. The signal detection performance and the probability are improved.

What is claimed is:

1. A multi-sectional coherent detection method, comprising the steps of:

A. dividing a length L used for the signal detection into $N_{multicoh}$ segments, performing coherent accumulating with each segment, and obtaining total $N_{multicoh}$ coherent results denoted as $X_i$ (i=0 ... $N_{noncoh}$–1);

B. performing various possible phase adjustments on those $N_{multicoh}$ coherent results (the number of the possible phase adjustments being denoted as P), and denoting the adjustment results as $Y_{i-j}$(i=0 ... $N_{multicoh}$–1, j=0 ... P–1);

C. selecting a value of the adjustment result from P adjustment results corresponding to each coherent result, and the largest number of the combinations being $C=P^{Nmulticoh}$, D. coherently accumulating $N_{multicoh}$ adjustment results in each combination and obtaining $C=P^{Nmulticoh}$ coherent results denoted as $Z_t$ (t=0 ... C–1);

E. among $C=P^{Nmulticoh}$ coherent results, selecting the optimum results as the detection results;

wherein, in the phase adjustment of step B, when the number of the phase adjustments is P, performing the phase rotation of $\phi=\phi_0+k*2\pi/p$, (k=0 ... P−1), on the signals respectively, wherein, $\phi_0$ may be any value.

2. A multi-selection coherent detection method according to claim 1, wherein, the segments in step A are equal spaced or unequal spaced.

3. A multi-selection coherent detection method according to claim 1, wherein, in the said step A, obtaining one $X_i$ for each segment, and there being total $N_{multicoh}$ coherent results; according to step b further, performing P phase adjustments for each coherent result, and obtaining total $N_{multicoh}*P$ adjustment coherent results.

4. A multi-section coherent detection method according to claim 3, wherein, selecting one adjustment coherent result from P adjustment coherent results corresponding to each coherent result, and carrying out the coherent overlapping on total $N_{multicoh}$ adjustment coherent results, and obtaining a final coherent result $Z_t$ obtained; in this way, there being total $C=P^{Nmulticoh}$ possible selection methods, then obtaining $C=P^{Nmulticoh}$ final coherent results $Z_t$ further.

5. A multi-selection coherent detection method according to claim 1, wherein, in step E, a method of largest mode is used as a criterion by a selector to calculate $Max_n s(n=1, 2 ... 8)$ for selecting the optimum branch results, wherein a comparison of the $Max_n s(n=1, 2 ... 8)$ results provides a final output detection result.

6. A multi-selection coherent detection method according to claim 4, wherein, the number of said coherent results is $C=P^{Nmulticoh}$ or less.

7. A multi-selection coherent detection device, wherein, the said detection device comprises: a matched filter unit; two or more branch units; and a branch selection unit, wherein an input signal is input to the matched filter unit; the output of the matched filter unit is sent to each branch unit respectively where phase adjustment and coherent accumulation of the signal is performed, and then sent to a branch selection unit where a method of largest mode is used as a criterion by a selector to calculate $Max_n s$ (n=1, 2 ... 8) for selecting the optimum branch branch results, wherein a comparison of the $Max_n s$ (n=1, 2 ... 8) results provides a final output detection result, wherein, each said branch unit further comprises: a multiplier, for carrying out the phase adjustment; an adder, for carrying out the coherent accumulation; a holder, for holding the data; a delay unit for delaying the data;

wherein the output of the matched filter is sent to the branch selection unit via the multiplier, and the adder in turn; and an adjustment series of four bits is sent to the multiplier via the holder, and an output of the adder is fed back to its input via the delay unit.

8. A multi-selection coherent detection device according to claim 7, wherein, both a holding time of the holder and a delay time of the delay unit are for a time period of 1024 chips.

* * * * *